(12) United States Patent
Kieran

(10) Patent No.: US 10,589,338 B1
(45) Date of Patent: Mar. 17, 2020

(54) FEED ASSEMBLY FOR AUTOMATED MACHINES

(71) Applicant: Thomas G. Kieran, Peoria, AZ (US)

(72) Inventor: Thomas G. Kieran, Peoria, AZ (US)

(*) Notice: Subject to any disclaimer, the term of this patent is extended or adjusted under 35 U.S.C. 154(b) by 352 days.

(21) Appl. No.: 15/672,811

(22) Filed: Aug. 9, 2017

(51) Int. Cl.
| | |
|---|---|
| *B21D 51/44* | (2006.01) |
| *B65G 43/08* | (2006.01) |
| *B23Q 41/02* | (2006.01) |
| *B29C 43/04* | (2006.01) |
| *B26D 5/30* | (2006.01) |

(52) U.S. Cl.
CPC ........... *B21D 51/44* (2013.01); *B21D 51/446* (2013.01); *B23Q 41/02* (2013.01); *B65G 43/08* (2013.01); *B26D 5/30* (2013.01); *B29C 2043/046* (2013.01)

(58) Field of Classification Search
CPC ...... B21D 51/44; B21D 51/446; B21D 51/46; B21D 43/26; B21D 43/003; B65B 63/00; B65G 43/00; B65G 43/08; B23Q 41/02; B29C 2043/046; B26D 5/30
USPC ...... 413/9, 45, 58; 198/341.03, 341.01, 530, 198/743, 745
See application file for complete search history.

(56) References Cited

U.S. PATENT DOCUMENTS

| | | | |
|---|---|---|---|
| 1,540,009 A | 6/1925 | Hothersall | |
| 1,628,338 A | 5/1927 | Skov | |
| 2,017,124 A | 10/1935 | Johnson | |
| 2,471,255 A | 5/1949 | Weisenburg | |
| 2,567,141 A | 9/1951 | Andrew | |
| 2,912,042 A | 11/1959 | Jenkins | |
| 3,541,751 A * | 11/1970 | Quebe | B65B 17/02 53/398 |
| 3,639,968 A * | 2/1972 | Price | B21D 51/46 413/47 |
| 3,782,525 A | 1/1974 | Flury | |
| 4,295,436 A | 10/1981 | Zangari et al. | |
| 4,568,406 A | 2/1986 | Kieran et al. | |
| 4,728,239 A | 3/1988 | Kieran et al. | |
| 4,776,447 A * | 10/1988 | Pitcher | B21D 43/003 198/379 |
| 5,108,356 A | 4/1992 | Rickenbach et al. | |
| 5,967,960 A * | 10/1999 | Foldesi, Sr. | B21D 51/46 413/58 |
| 6,405,448 B1 | 6/2002 | Watkins | |

* cited by examiner

*Primary Examiner* — Jimmy T Nguyen

(74) *Attorney, Agent, or Firm* — Thomas W. Galvani, P.C.; Thomas W. Galvani

(57) ABSTRACT

An assembly for feeding objects downstream into an automated machine includes a track, a tamping location on the track, a stop disposed at the tamping location, and a forward path through the track. A spring proximate to the tamping location moves between a first position and a second position. In the first position of the spring, the spring cooperates with the stop to interrupt the forward path. In the second position of the spring, the spring cooperates with the stop to open the forward path to allow objects to move downstream in the track.

9 Claims, 10 Drawing Sheets

FEED ASSEMBLY FOR AUTOMATED MACHINES

FIELD OF THE INVENTION

The present invention relates generally to machines, and more particularly to cap-lining machines.

BACKGROUND OF THE INVENTION

Container closures or caps are generally lined with a thin metal foil or paper liner before assembly onto the container. There are many types of machines for applying liners to caps. Most machines operate by feeding a cap into a cap-lining machine where a paper insert is punched from a web of liner paper and then tamped into the cap, and most line caps at an incredible rate. The machines often fail, however, creating downtime that can result in production and supply issues.

In many early cap-lining machines, the caps were mechanically fed into the cap-lining machine, such as by a stuffer rod which pushed a set of caps into a channel toward the machine. A line of caps thus forcefully moved through the channel, the stuffer rod pushing the line forward toward a tamping location.

New cap construction techniques, however, rendered many of these past machines, such as those reliant on stuffer rods, undesirable. Cap manufacturers increasingly use softer and lighter materials to save costs. While the use of less material in a cap does save on manufacturing costs, it creates a thinner, more pliable cap. When such caps are advanced through a narrow channel, as by a stuffer rod, they frequently deform under the stuffing force and then bind within the channel. The caps may be permanently deformed, in which case the liner inserts cannot be properly applied to the caps, or the caps may actually crack, in which case the liner insert can be applied but will of course be wasted when the cap is rejected. When a cap binds within the channel, the upstream caps are prevented from moving forwardly, and the downstream caps may fail to advance. As more caps are fed or stuffed into the channel, the upstream caps can be forced into the stuck cap, which may cause them to be jammed, deformed, or broken as well. While the cap-lining machine may detect that a new cap has not been presented to the tamping location, upstream caps may continue to be damaged, and a worker must shut the machine down, remove the bound cap, inspect the machine for damage, inspect and remove damaged upstream caps from the system, and restart the machine.

The lighter construction of caps presents problems for holding the caps in position in preparation for tamping as well. In the past, caps were placed in the tamping location under the punch or tamp and held in alignment with the tamp by a biased or sprung mechanism acting on the cap from the sides, such as gripping jaws. After the cap had been lined, the cap would be released from the mechanism and allowed to move forward. Caps would frequently be squeezed out of the mechanism at high speeds, which could cause the caps to fly out of the machine, move too quickly for downstream daisy-chained operations, or jam in the downstream channel. Further, the mechanism could deform or even crush the cap while it was being held in place for lining. This would result in an improperly-fit liner insert, caps moved out of alignment from the tamp, smashed caps, jammed tamping locations, and other problems which caused mechanical damage to the cap-lining machine and could require the cap-lining machine to be shut down and repaired.

Old machines were also dangerous to users. Most of the mechanical assemblies that would stop the feed of the liner paper when a cap was missing used heavy, complex, moving parts. Machines that mechanically moved caps into place, such as by large rotating tables, cam-driven racks, or stuff rods, usually employed heavy, rugged, metal fixtures. The stuffer rods, for instance, were frequently driven by clutched gear assemblies capable of producing a large amount of torque and force to push a long line of caps toward and through a cap-lining machine. Moving parts such as these presented safety hazards to errant fingers and limbs.

An improved and safer system and method for advancing caps into a tamping location is needed.

SUMMARY OF THE INVENTION

An assembly for feeding objects downstream into an automated machine includes a track, a tamping location on the track, a stop disposed at the tamping location, and a forward path through the track. A spring proximate to the tamping location moves between a first position and a second position. In the first position of the spring, the spring cooperates with the stop to interrupt the forward path. In the second position of the spring, the spring cooperates with the stop to open the forward path to allow objects to move downstream in the track.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
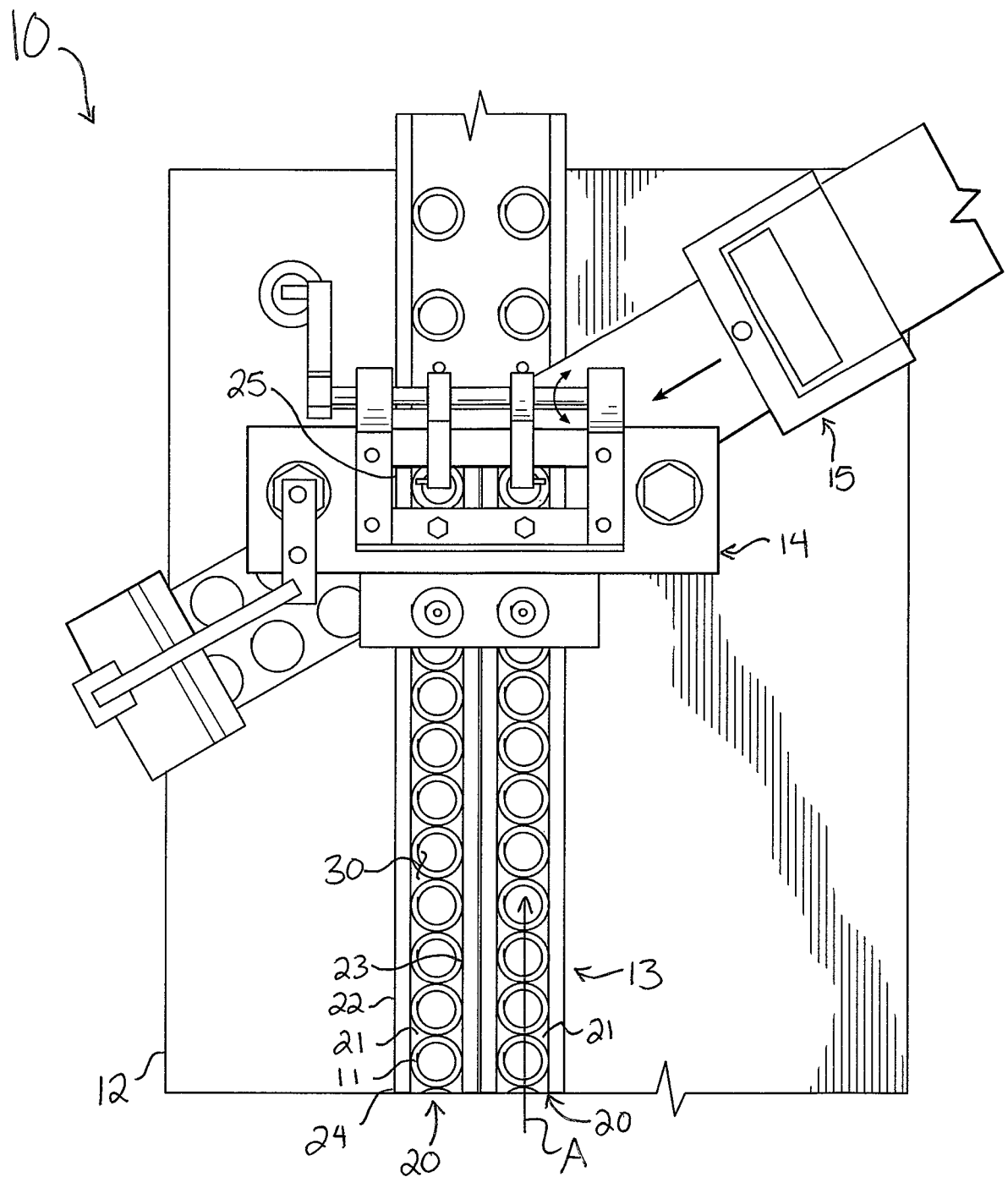
FIG. 1 is a top plan view of a cap-lining machine including tracks moving a line of caps into a cap-lining mechanism under the cap-lining machine.

Reference now is made to the drawings, in which the same reference characters are used throughout the different figures to designate the same elements. FIG. 1 shows a cap-lining machine 10 useful for lining container closures or caps 11 with liner paper. The cap-lining machine 10 is mounted on a solid, stable table 12 and includes a track assembly 13, a cap-lining mechanism 14, and a liner paper feeder 15. The caps 11 are supplied from a supply bin or hopper onto the track assembly 13 and moved down the track assembly 13 under the force of gravity or friction toward the cap-lining mechanism 14 in a downstream direction indicated by the line A in FIG. 1. The liner paper feeder 15 feeds a web of liner paper and then cuts and tamps liner inserts into the caps 11, which then exit the cap-lining mechanism 14 in an assembled condition.

In the embodiment shown in FIG. 1, the caps 11 are fed, two at a time, into the cap-lining mechanism 14 on two tracks 20 in the track assembly 13. The track assembly 13 is a linear feed into the cap-lining mechanism 14, allowing caps to be continually moved downstream into the cap-lining mechanism 14 to maintain a short operational cycle time of the cap-lining mechanism 14. The cap-lining mechanism 14 may be modified to punch and tamp liner inserts into one, two, three, or more caps at once by modifying the number of tracks in the track assembly 13 without affecting the operational cycle time of the cap-lining mechanism 14. For example, a track assembly might have eleven separate tracks for feeding rows of eleven caps into the cap-lining mechanism simultaneously. The cap-lining mechanism would have eleven stations punching and tamping liner inserts into the rows of eleven caps. In the embodiment shown in FIG. 1, however, the cap-lining mechanism 14 is arranged to line two caps 11 at once. Discussion will thus be with respect to the two-track arrangement, with the understanding that that the discussion applies equally to cap-lining machines employing a different number of tracks. The two tracks 20 are identical in every respect, and only one of the tracks 20 will be discussed with the understanding that the discussion applies equally to both tracks 20.

Figure 2:
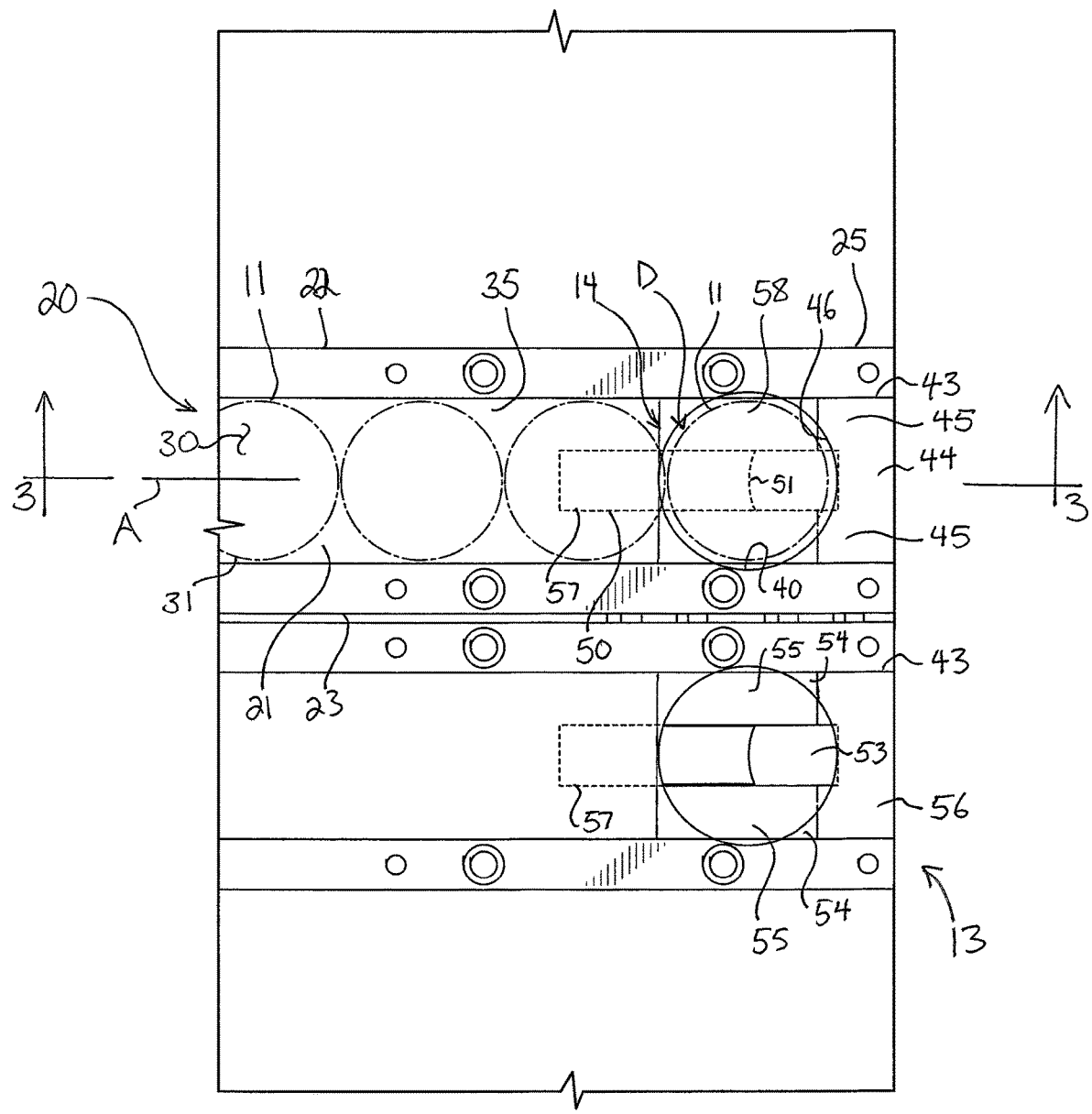
FIG. 2 is a top plan view of the cap-lining mechanism of FIG. 1.

With reference to FIG. 1 and also to FIG. 2, the track 20 is straight and includes a base 21 and opposed upstanding sidewalls 22 and 23 which extend linearly between an upstream end 24 and a downstream end 25 of the track 20. The upstream end 24 is shown here within the margins of the page, but one having ordinary skill in the art will appreciate that it will typically begin further away at the supply bin or hopper. The downstream end 25 is located directly under the cap-lining mechanism 14. The base 21 and the sidewalls 24 and 25 cooperate to define an elongate volume or channel 30 in the track 20 through which the caps move downstream along a forward path A from the upstream end 24 to the downstream end 25.

The caps 11, which are shown in broken line in FIG. 2, each have sidewalls 31, open bottoms 32, and closed tops 33. The caps 11, of course, are inverted so that they may be tamped with the liner inserts, and as such, the open bottoms 32 are directed upward and the closed tops 22 are directed downwards against the base 21 of the track 20. The channel 30 has a width which is only slightly greater than the outer diameter of the sidewalls 31 of the caps 11, and therefore, as the caps 11 move downstream along the forward path A through the channel 30, lateral movement of the caps 11 within the channel 30 is limited by interaction of the sidewalls 31 of the caps 11 with the sidewalls 22 and 23 of the track 20.

The track 20 is fit with a cover 34, more easily seen in FIGS. 3A-3G, that extends fully across the track 20 between the sidewalls 22 and 23 along the full length from the upstream end 24 to the downstream end 25. The caps 11 have a height B between the bottom 32 and top 33, and the track 20 has a height C between the base 21 and the cover 34; the height C is just slightly greater than the height B. For example, the height B of each of the caps 11 is approximately 0.450 inches, and the height C is approximately 0.500 inches, providing a gap of approximately 0.050 inches between the open bottoms 32 of the caps 11 (which are directed upwards) and the cover 34.

Returning to FIG. 1, the caps 11 move in the track 20 downstream toward the cap-lining mechanism 14 in preparation for lining. The caps 11 are fed by a gravity feed onto the track 20 from the supply bin or hopper (not shown). The base 21 of the track 20 has an upper surface 35 with a low coefficient of friction. Constructed with this material characteristic, the base 21 allows the caps 11 to slide downstream on their tops 33 with low frictional resistance with respect to the upper surface 35. The base 21 is preferably constructed out of a polished metal, but may be constructed out of another material or combination of materials having low-coefficients of friction, such as plastic. Alternatively, the upper surface 35 may be polished or sprayed with an anti-friction coating, such as polytetrafluoroethylene.

Referring now to FIGS. 2 and 3A-3G, the caps 11 move toward the downstream end 25 into a tamping location D. The tamping location D is a circular area on the base 21 having a size corresponding to the caps 11 and which is registered with a tamp 41 and punch 42 of the cap-lining mechanism 14 so that when a cap 11 is disposed in the tamping location D, actuation of the tamp 41 and the punch 42 will punch and tamp a liner insert into the cap 11. Just above the tamping location D, a bore 40 is formed through the cover 34. The bore 40 is a cylindrical hole extending vertically through the cover 34. The bore 40 is sized to allow the tamp 41 to pass through the cover 34 into the channel 30 and tamp the liner insert into the cap 11.

The caps 11 are advanced under their own weight, or by friction such as produced by a drive belt, into the tamping location D, as shown in FIG. 2 by the line of upstream caps extending upstream from the tamping location D. The downstream cap 11 is stopped and held at the tamping location D, directly under the bore 40 and the tamp 41. The downstream cap 11 is held at the tamping location D until the tamp cycles, at which point the tamp 41 re-positions the downstream cap 11 so that it may advance further forward. The structure and function of this operation is now described with reference to FIGS. 3A-3G.

At the downstream end 25, the tamp 41 and the punch 42 are located above the bore 40 through the cover 34. The tamp 41 and punch 42 are elements of the cap-lining mechanism 14. The punch 42 has a lower circular cutting element which cuts through the web of liner paper to form a disc-shaped liner insert, and the tamp 41 tamps this disc-shaped liner insert into the cap 11 disposed in the tamping location D. The tamp 41 is surrounded by the punch 42, and both reciprocate vertically between raised and lowered positions so that the tamp 41 may descend through the bore 40 and down into a cap 11 held at the tamping location D.

A stop 43 is formed on a lower surface 36 of the cover 34 on a downstream side of the bore 40. The stop 43 is a small projection extending downward from the lower surface 36 of the cover 34 and into the channel 30, interrupting the forward channel A. It includes a back 44 and two opposed wings 45 (only one wing 45 is shown in the section view of FIG. 3A) extending upstream from the back 44. The back and the wings 45 cooperate to form a concave front edge 46, best shown in the top view of FIG. 2. The concave front edge 46 is circular, has the same inner diameter as the bore 40, has the same outer diameter as the cap 11, is coaxial to the bore 40, and as such is registered with a downstream portion of the bore 40. In other words, the concave front edge 46 extends right along a downstream portion of the bore 40, in opposition to a cap 11 moving down through the channel 30.

The stop 43 has a height E (shown in FIG. 3B) which projects downward from the lower surface 36 of the cover 34 into the channel 30. This height E is greater than the difference between the heights B and C of the caps 11 and the track 20, respectively. Accordingly, the stop 43 depends downwardly into the channel 30 to interrupt and prevent downstream movement of the downstream cap 11 along the forward path A past the stop 43: there is not enough vertical room, or play, between the stop 43 and the upper surface 35 of the base 21 for the cap 11 to slip under the stop 43.

Additionally, at the upstream edge of the bore 40 and upstream of the stop 43, a linear flex spring, or cantilever spring 50, is disposed above an exit assembly 52 for the track 20. The cantilever spring 50 is secured in the base 21 or formed integrally thereto, and extends slightly upward at an angle from the upper surface 35 of the base 21. The cantilever spring 50 includes a thin tongue of spring material having parallel sides and a concave free end 51 opposing a base 57. The base 57 is secured in the base 21 of the track 20, and the free end 51 extends forwardly from the base 57' such that it is cantilevered over the exit assembly 52. The concave shape of the free end 51 corresponds in radius to the caps 11. The cantilever spring 50, being made of spring material, is biased into a first, or raised, position shown in FIG. 3A. It deflects into a depressed position shown in FIG. 3D, where the cantilever spring 50 recedes into the exit assembly 52.

The exit assembly 52 is an arrangement of ramps formed into the track 20 and extending downstream away from the tamping location D. The exit assembly 52 includes a long, slender central ramp 53 flanked on either side by dual-pitch ramps 54. The central ramp 53 is located centrally with respect to the sidewalls 22 and 23 of the track 20 and descends from the upper surface 35 just upstream from the tamping location D to just upstream from the downstream end 25. The central ramp 53 has a width just greater than the width of the cantilever spring 50, so that, when the cantilever spring 50 moves into the depressed position, it recedes below the upper surface 35 of the base 21 into the central ramp 53.

The dual pitch ramps 54 flanking the central ramp 53 are identical and include an upper pitch 55 and a common lower pitch 56. The upper pitches 55 descend from the upper surface 35 at the upstream edge of the tamping location D and extend to the downstream edge of the tamping location D. The upper pitches 55 are flat and parallel to the upper surface 35, and thus form a depressed seat 58 with respect to the upper surface 35 having a central slot therein for receipt of the cantilever spring 50 in the depressed position thereof. The upper pitches 55 then transition into the common lower pitch 56 proximate the downstream edge of the central ramp 53. The vertical distance between the flat upper pitches 55 and the bottom of the stop 43 is greater than the height B of the caps 11; a cap 11 seated in the upper pitches 55 can slip under the stop 43. The cantilever spring 50 prevents the cap 11 from dropping into the seat 58 and under the stop 43.

In operation, the cap-lining mechanism 14 is useful to smoothly and efficiently advance the caps 11 under their own weight or friction into the tamping location D and then, once tamped, move the lined cap 11 out of the tamping location D. It does this without automation or monitoring at or around the tamping location D, and without action other than the motion of the tamp 41. This operation is now described, chiefly with respect to the sequence of steps shown in FIGS. 3A-3G.

Figure 3A:
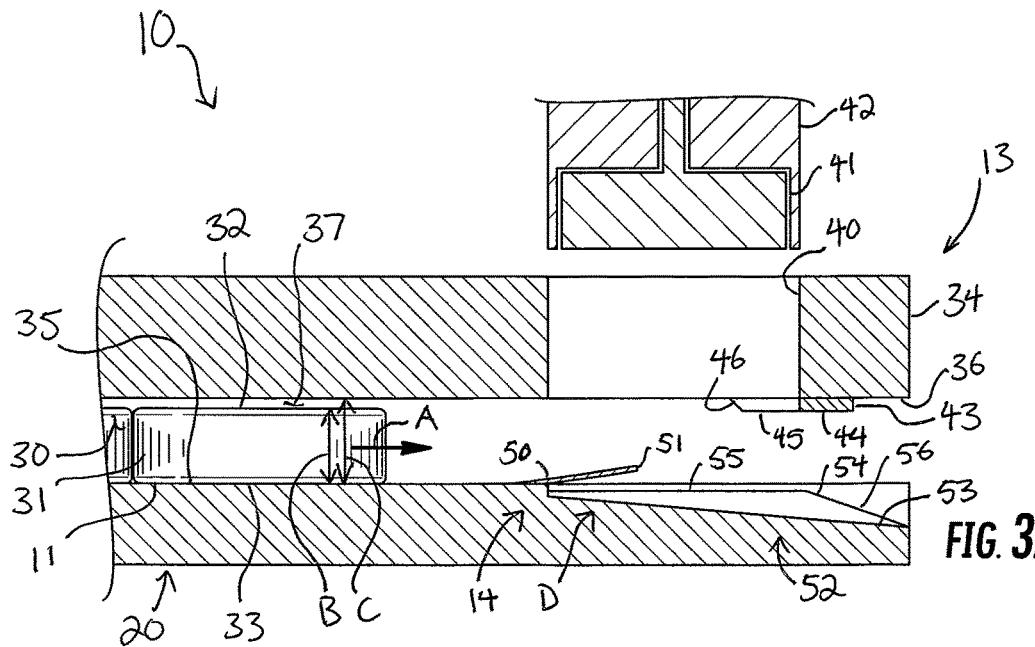
FIGS. 3A-3G are section views of the cap-lining mechanism of FIG. 1 taken along the line 3-3 in FIG. 2, showing a line of caps moving through the cap-lining mechanism.

FIG. 3A illustrates the cap-lining machine 10 ready to line the first cap 10 with a liner insert. A line of caps 11 moves downstream along a forward path A. The first cap 11 is referred to as the downstream cap 11. It slides and moves smoothly down the track 20 under the force of the weight of the upstream caps 11 or by the force of friction from a drive belt. The caps 11 all fit snugly between the sidewalls 22 and 23 of the track 20, and are just shorter than the channel 20 with the gap 37 above the inverted open bottoms 32 of the caps 11.

Figure 3B:
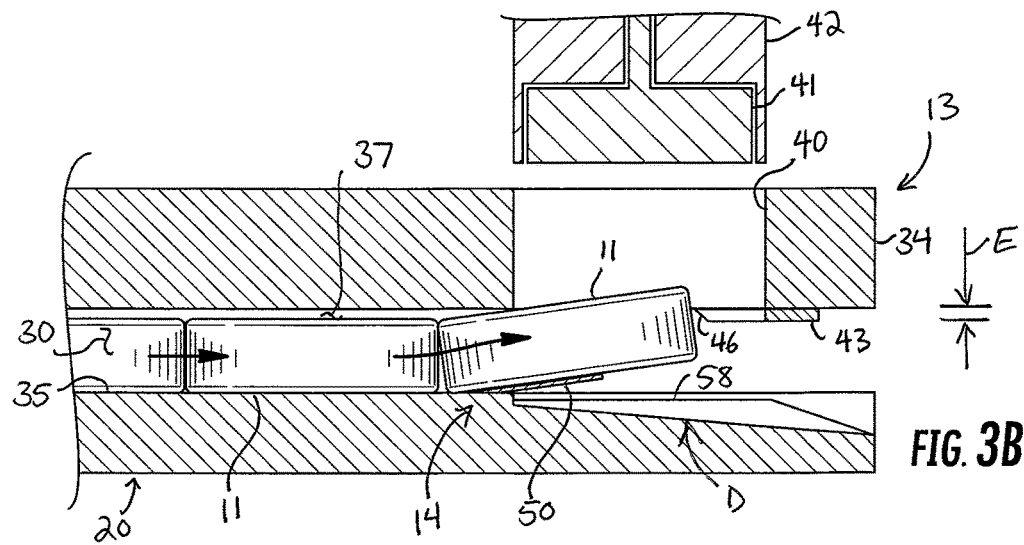

The cantilever spring 50 is in the raised position, projecting upwardly from the upper surface 35 of the base 21 toward the cover 34. As the downstream cap 11 moves forward, it slides up the cantilever spring 50, as shown in FIG. 3B. Because there is the slight vertical gap 37 between the cap 11 and the cover 34, the cap 11 is able to tilt slightly to ride up the cantilever spring 50; the cap 11 does not bind when riding up the cantilever spring 50. The downstream cap 11 thus becomes elevated with respect to all caps 11 upstream.

Figure 3C:
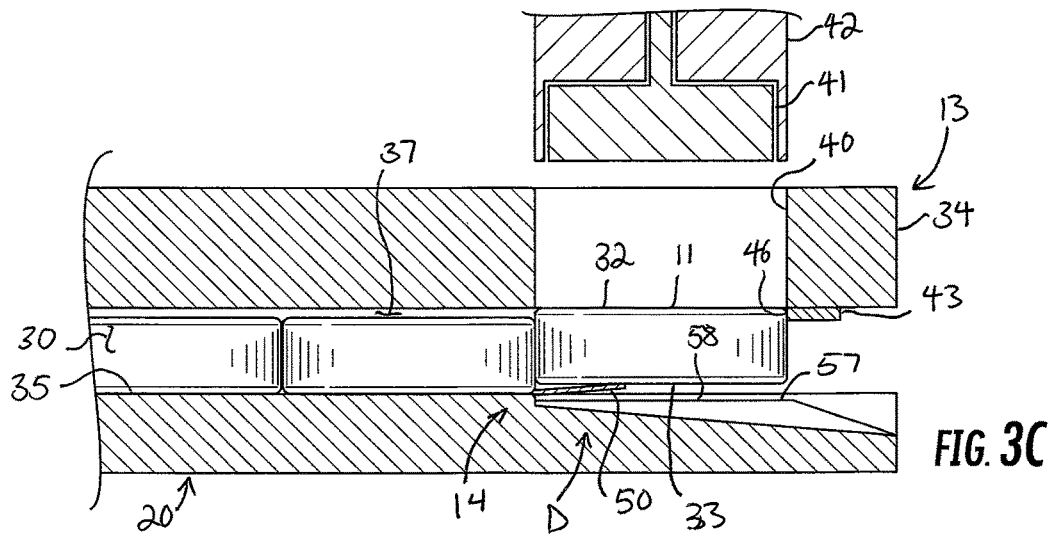

The downstream cap 11 continues to advance forward and ride up the cantilever spring 50 until the downstream edge of the cap 11 contacts the stop 43. The concave front edge 46 conforms in shape to the radius of the cap 11, and as such, the downstream edge of the cap 11 is flushly received in contact against the concave front edge 46, as shown in FIG. 3C. The stop 43 prevents further downstream movement of the cap 11 along the forward path A. As shown in FIG. 3C, the downstream cap 11 cannot move: the stop 43 prevents downstream movement, the bore 40 prevents upward movement, and the cantilever spring 50 prevents the cap 11 from slipping under the stop 43. The sidewalls 22 and 23 prevent the cap 11 from moving laterally, and of course, the upstream caps 11 press the downstream cap 11 lightly forwardly and prevent upstream movement. The downstream cap 11 is thus prevented from moving along the forward the path A in the channel 30 and is held level and parallel with respect to the upper surface 35. And while the weight of the cap 11 is not negligible, it is not so great as to overcome the spring force of the cantilever spring 50; as such, the cantilever spring 50 is only deflected slightly toward the depressed position, and the downstream cap 11 remains elevated with respect to all caps 11 upstream, in confrontation with the stop 43. In this way, the downstream cap 11 is held stationary at the tamping location D, flat, and registered underneath the bore 40 and the tamp 41.

Figure 3D:
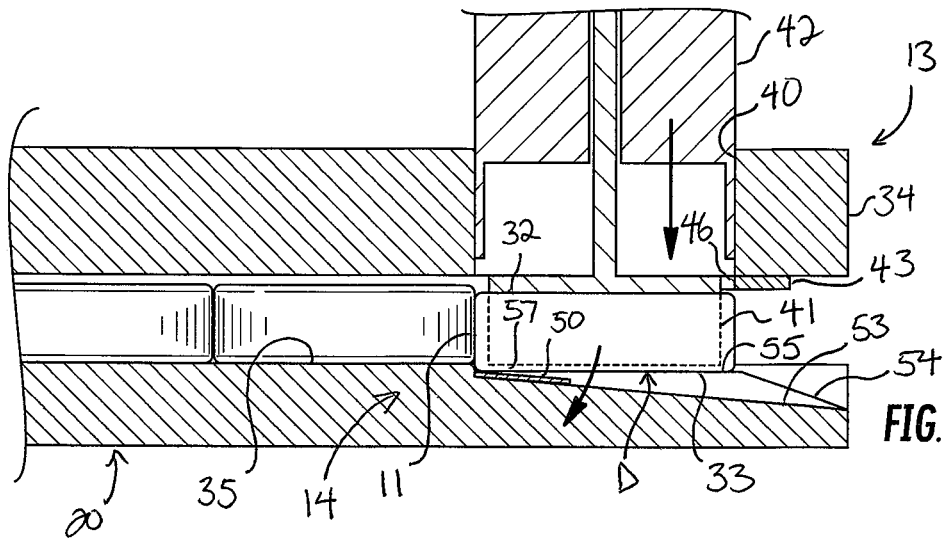

With the downstream cap 11 so registered, the tamp 41 and punch 42 move downward toward the base 21. As shown in FIG. 3D, the punch 42 moves downward into the bore 40 and stops before its lower edge exits the bore. The movement of the punch 42 downward cuts the liner insert (not shown) from the web of liner paper (not shown) which would be positioned above the cover 34 but below the tamp 41 and punch 42 in their raised positions. After the punch 42 cuts the liner insert, the tamp 41 carries it downward as the tamp 41 moves downward into the downstream cap 11. The tamp 41 moves downward into the downstream cap 11, thereby pushing the downstream cap 11 down until the closed top 33 of the cap 11 is received in the seat 58 defined by the upper pitches 55 of the dual-pitch ramp 54. In moving downward, the force against the cap 11 overcomes the spring force of the cantilever spring 50, and the cantilever spring 50 is pushed downward into the recessed space of the central ramp 53 between the flanking upper pitches 55 of the dual-pitch ramp 54. When the cantilever spring 50 moves into a second, deflected, or lowered position thereof, it cooperates with the stop 43 to open the forward path A, as is explained below.

The upper pitches 55 are flat, level, and parallel with respect to the upper surface 35. As such, the closed top 33 in the seat 58 of the downstream cap 11, which is received in flush contact against the upper pitches 55, is parallel with respect to the upper surface 35. Further, the open bottom 32 of the downstream cap 11 is also parallel to the upper surface 35, and is now just below the stop 43. As can be seen in FIG. 3D, in this depressed position of the downstream cap 11, the downstream cap 11 is below the stop 43 and a gap is defined between the open bottom 32 and the stop 43.

Figure 3E:
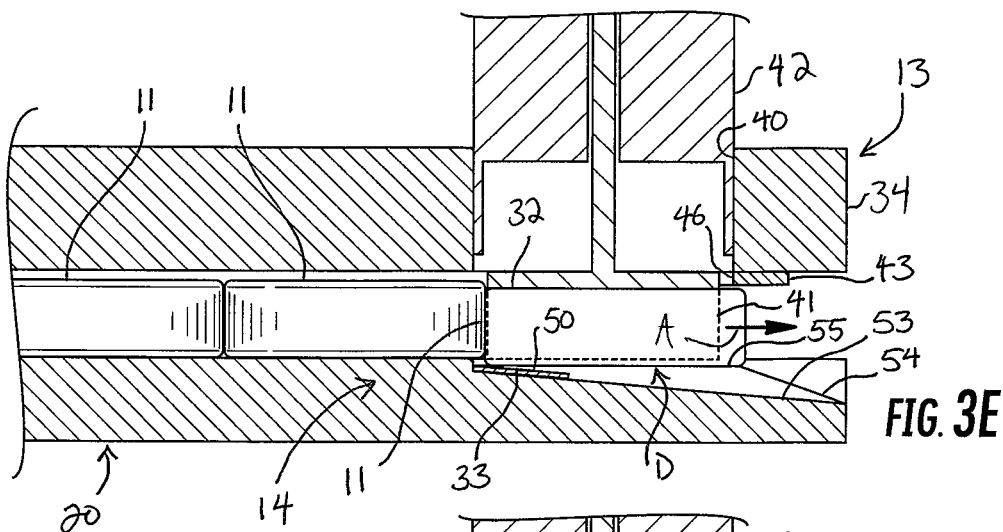

Though the downstream cap 11 is below the stop 43, in FIG. 3D, the downstream edge of the cap 11 is still just behind the front edge 46 of the stop 43. For a brief moment, this characterizes the position of the downstream cap 11. However, as shown in FIG. 3E, the force of the weight of the upstream caps 11, or friction from a drive belt, immediately pushes the downstream cap 11 downstream and out of the tamping location D. As soon as the downstream cap 11 moves downstream out of the tamping location D, it slides around, or, more specifically, under the stop 43; the downstream edge of the downstream cap 11 moves downstream from the front edge 46 of the stop 43. The tamp 41 has an outer diameter which is less than the inner diameter of the cap 11, and the cap 11 is thus able to slide along the forward path A this incremental amount while the tamp 41 is still in the extended position.

Figure 3F:
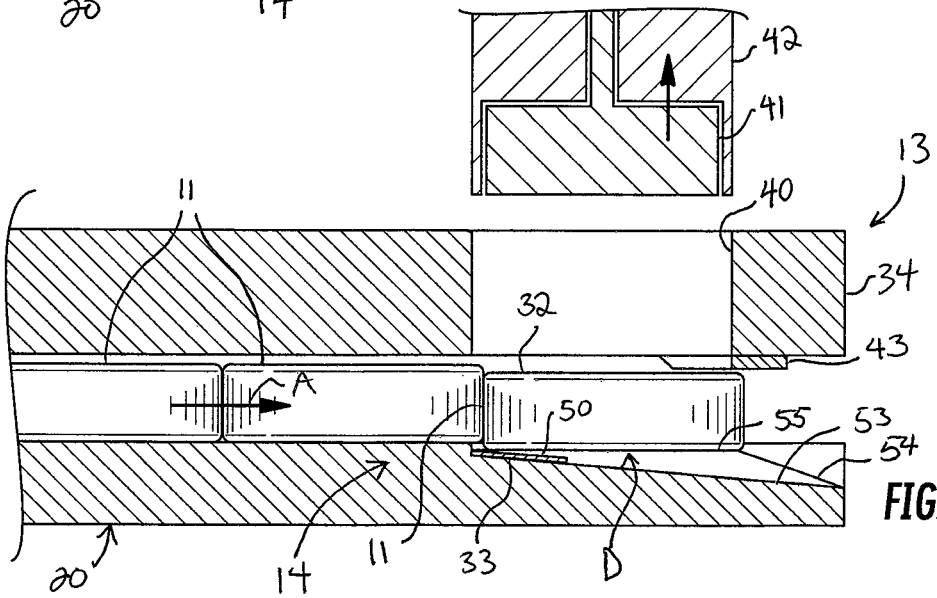

As shown in FIG. 3F, after the tamp 41 has pressed the liner insert into the cap 11, the tamp 41 retracts and moves upward, as does the punch 42. Once the tamp 41 is above the cap 11, the force of the weight of the upstream caps 11, or friction, pushes the downstream cap 11 further downstream and away from the tamping location D. Even though the tamp 41 has retracted, the cantilever spring 50 remains depressed in the depressed position in the central ramp 53 because the downstream edge of the cap 11 has slipped under the stop 43 and is thus prevented from moving upward by the stop 43.

Figure 3G:
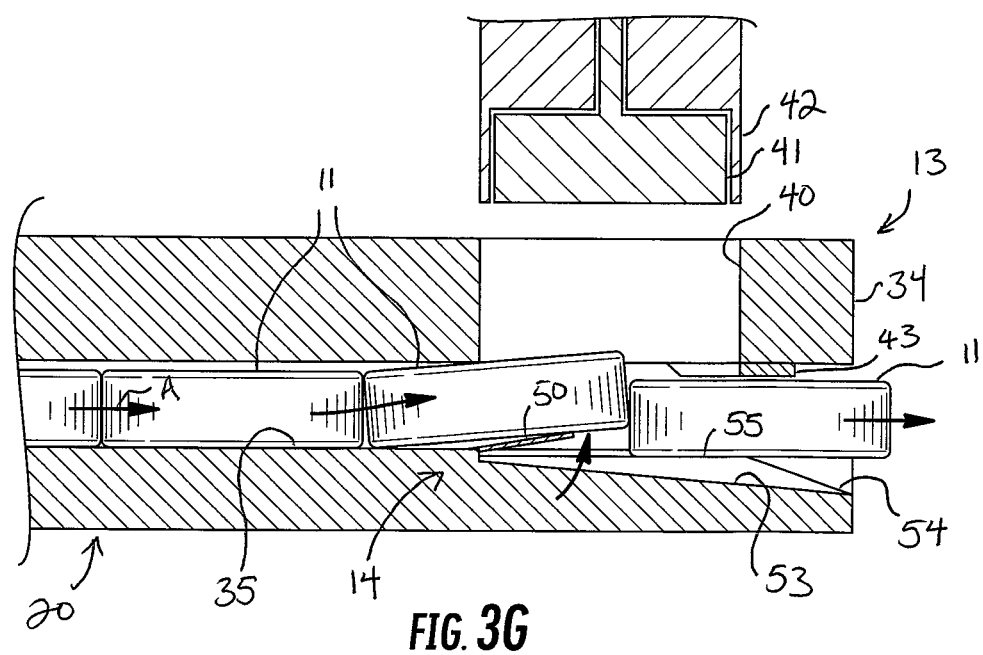

As the upstream caps 11 move downstream, the downstream cap 11 is pushed out of the track assembly 13, as shown in FIG. 3G. Once the downstream cap 11 has moved downstream out of the tamping location D and no longer overlies the cantilever spring 50, the cantilever spring 50 springs back up to its raised position, thereby cooperating with the stop 43 to close the forward path A. As it does, the next cap 11 moves forward and slides up the raised cantilever spring 50. The downstream cap 11 exits the track assembly 13, and the next cap 11 becomes the next downstream cap 11, moving through the track 20 as described above. This process repeats cyclically over and over, until all caps 11 are processed. Although the above description is provided in the form of a long narrative including a sequence of steps, it should be understood that a single operation cycle of advancing a cap 11 into the tamping location D, tamping a liner insert into the cap 11, and moving the cap 11 out of the tamping location D is accomplished in smooth, continuous motions taking only a small fraction of a second to perform.

Figure 4:
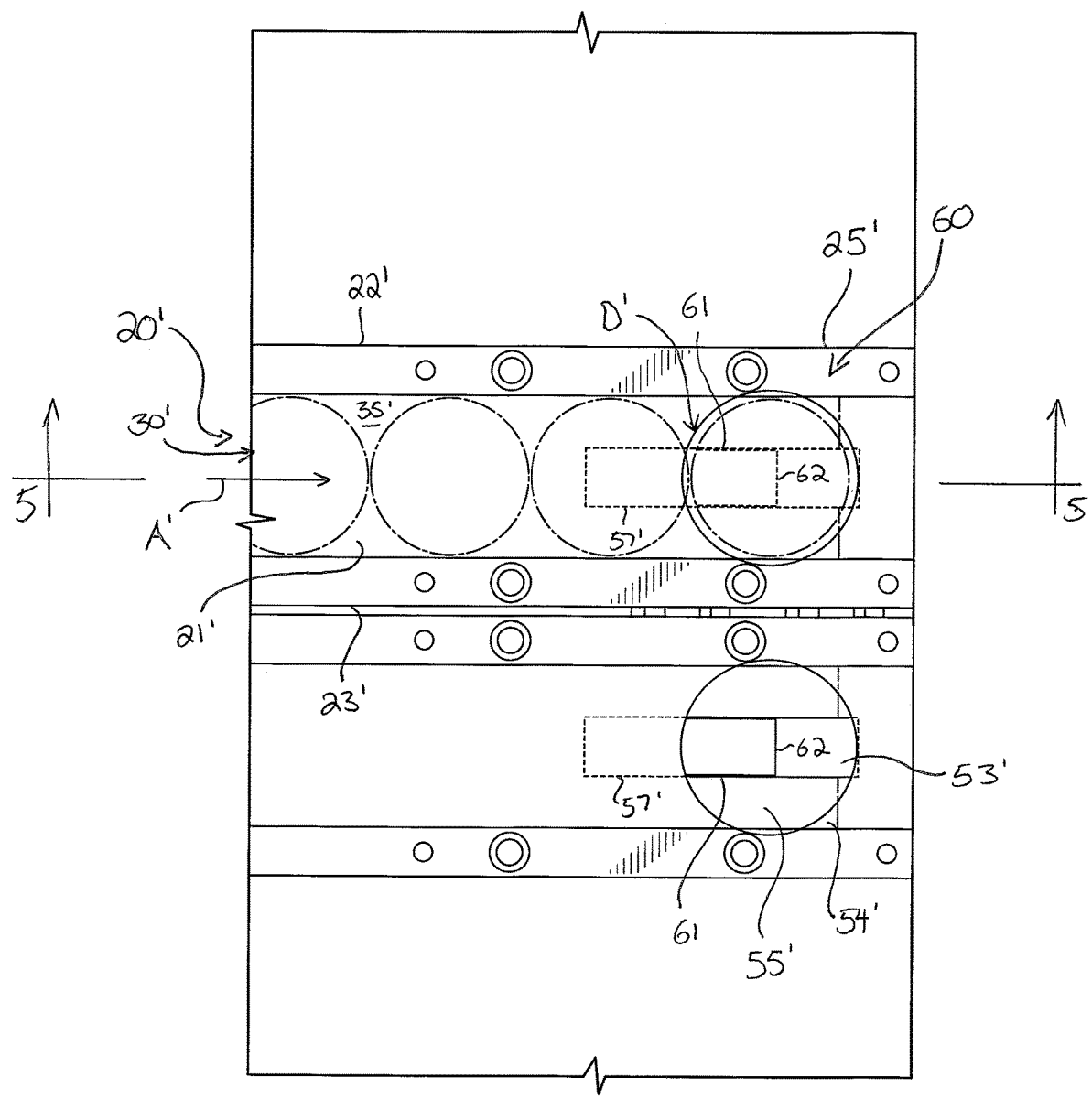
FIG. 4 is a top plan view of a cap-lining mechanism.
Figure 5A:
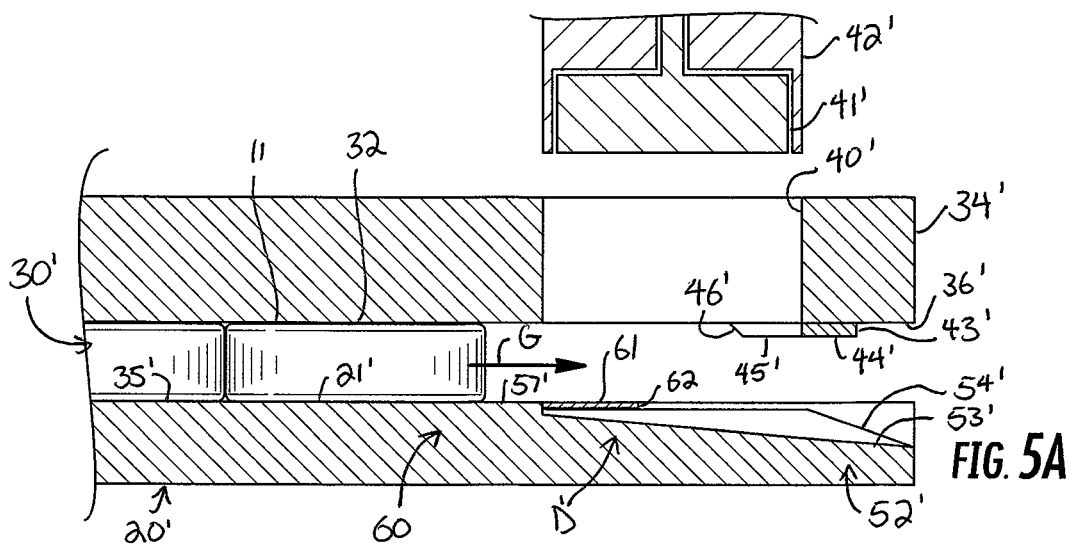
FIGS. 5A-5F are section views of the cap-lining mechanism of FIG. 4 taken along the line 5-5 in FIG. 4, showing a line of caps moving through the cap-lining mechanism.
Figure 5B:
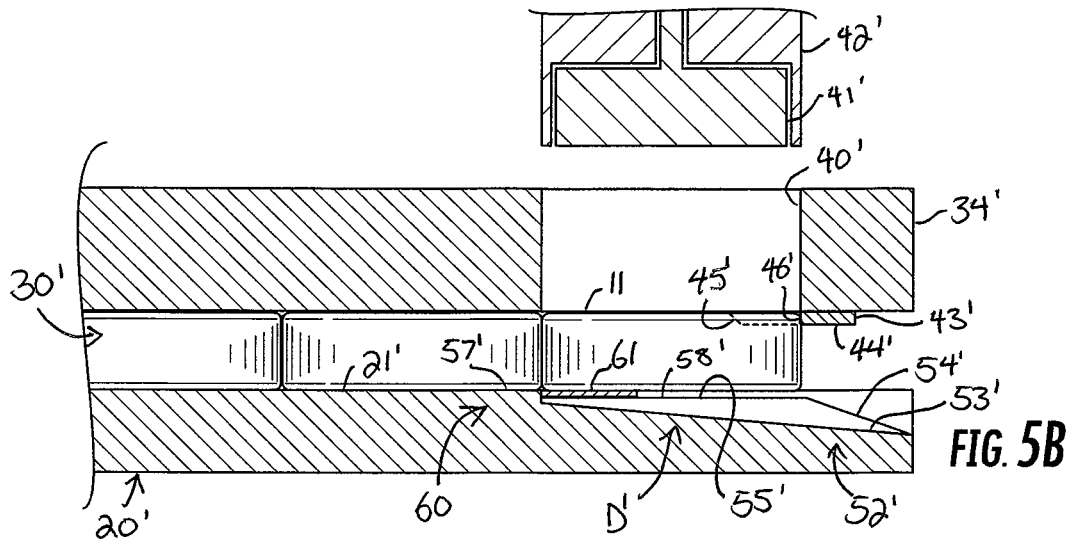
Figure 5C:
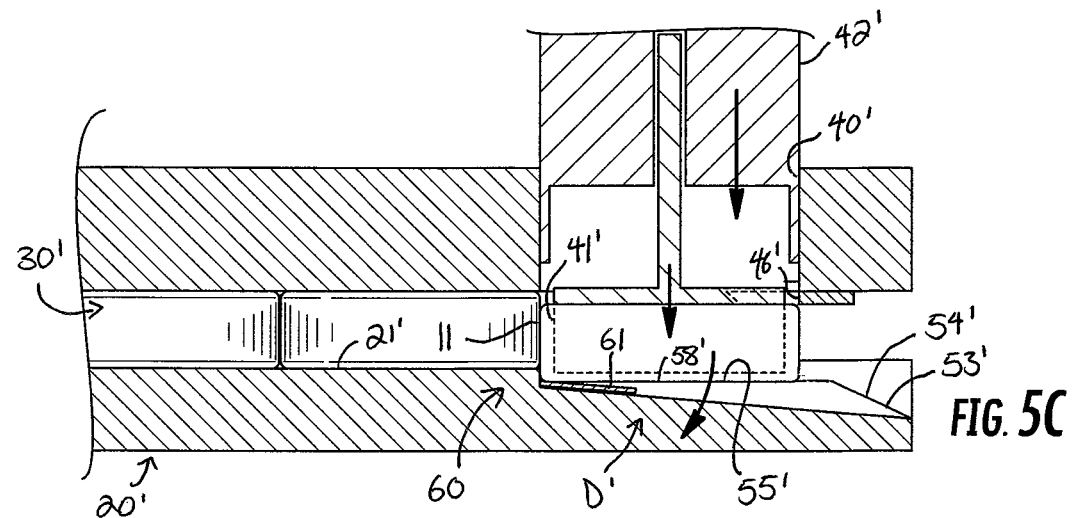
Figure 5D:
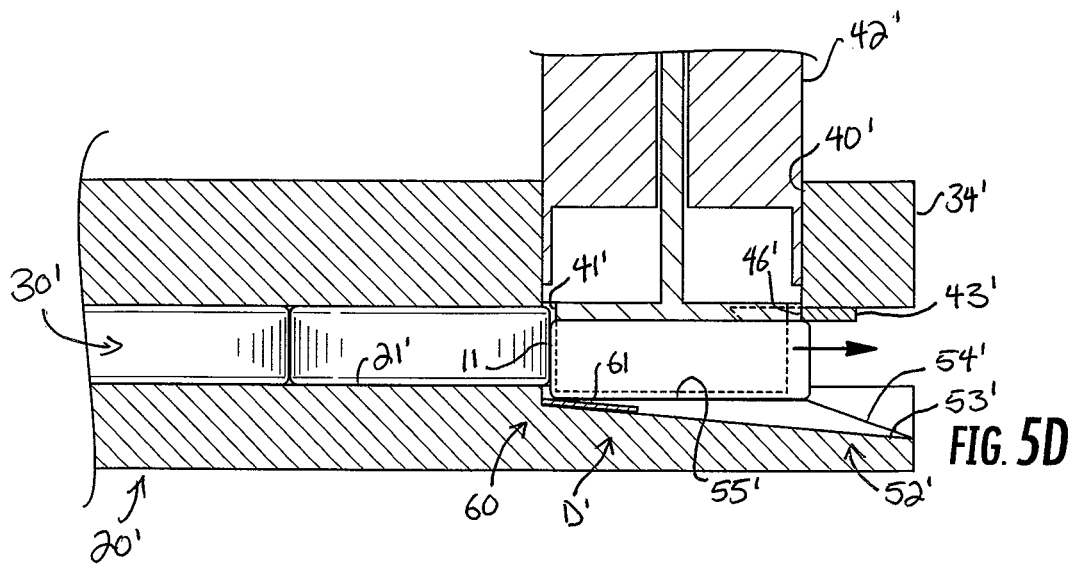
Figure 5E:
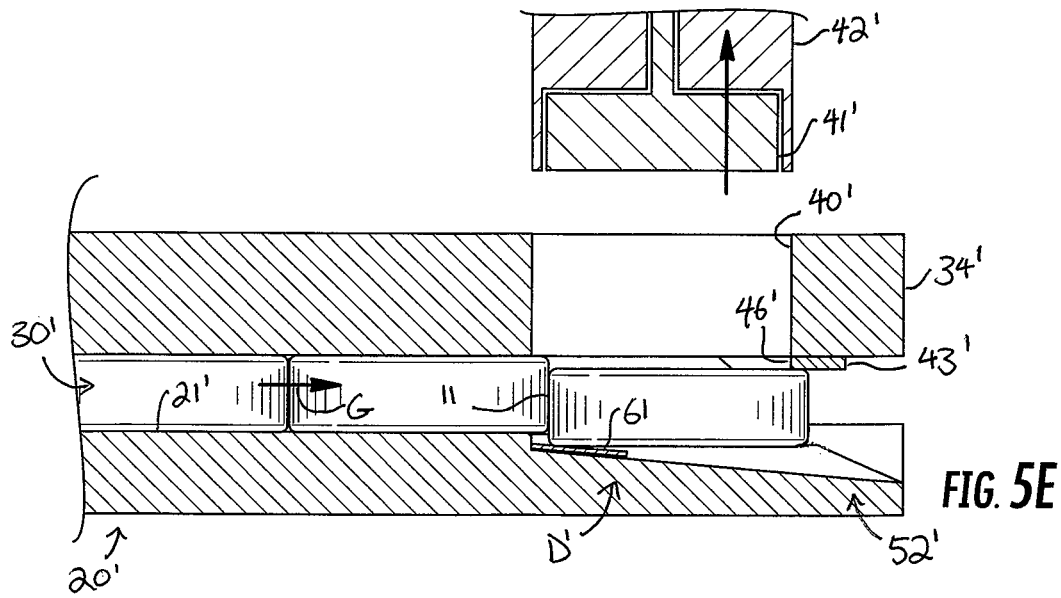
Figure 5F:
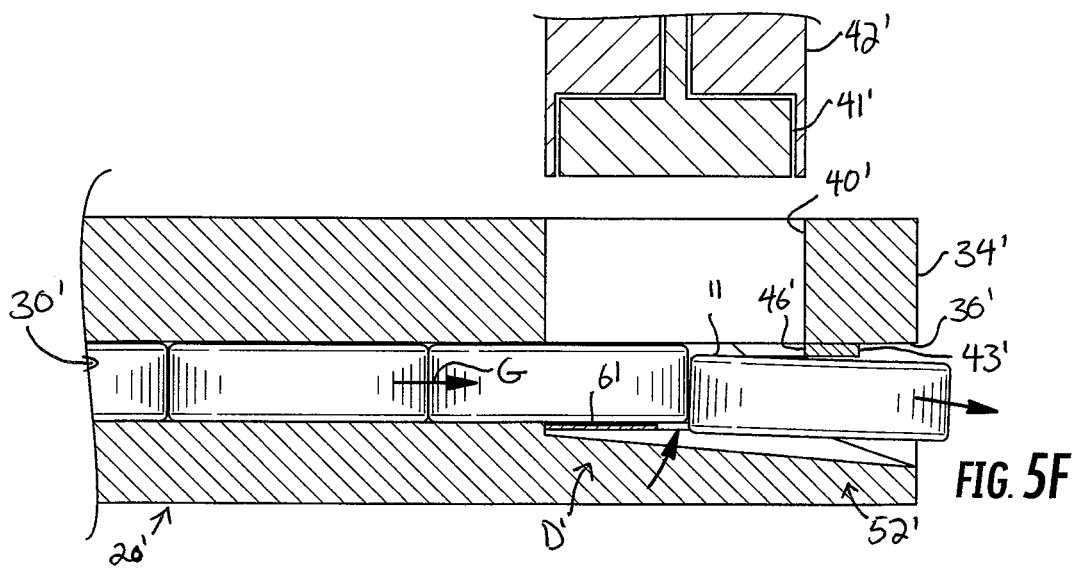

FIGS. 4-5F illustrate another embodiment of a cap-lining mechanism 60 useful for feeding caps 11 into a cap-lining machine for lining with liner paper. The cap-lining mechanism 60 is similar to the cap-lining mechanism 14 in many ways, and indeed, includes many structural elements and features identical to those in the cap-lining mechanism 14. As such, for simplicity, the description of the cap-lining mechanism 60 herein adopts the reference characters of the structural elements and features of the cap-lining mechanism 60 to denote identical structural elements and features in the cap-lining mechanism 14, but marks them with a prime ("'") symbol to distinguish them.

The cap-lining mechanism 14 includes a track 20' including a base 21', sidewalls 22' and 23', an upstream end, a downstream end 25', a channel 30', cover 34', and upper and lower surfaces 35' and 36'. The same caps 11 are used in the cap-lining mechanism 14 and 60, and they are advanced to a tamping location D' under the tamp 41' and punch 42'.

In the cap-lining mechanism 14, the caps 11 fit well under the lower surface 36 of the cover 34, defining the gap 37 between the inverted bottoms 32 of the caps 11 and the lower surface 36. In the cap-lining mechanism 60, however, the caps 11 are closely fit into the channel 30'. There is no gap between the bottoms 32 of the caps 11 and the lower surface 36': the inverted bottoms 32 slide against the lower surface 36' just as the tops 33' slide along the upper surface 35' of the base 20'. As such, there is no room for the caps 11 to pitch or tip within the channel 30', and so the cap-lining mechanism 60 possesses some design differences from the cap-lining mechanism 14.

Below the upstream edge of the bore 40' and upstream of the stop 43', a linear flex spring, or cantilever spring 61 is disposed in the base 21' of the track 20', above an exit assembly 52' for the track 20'. The cantilever spring 60 is secured in the base 21 or is formed integrally thereto, and it extends forwardly level with the base 21, such that the top of the cantilever spring 60 is a contiguous, but narrow, extension of the upper surface 35' of the base 21'. The cantilever spring 61 includes a thin tongue of spring material having parallel sides and a flat free end 62 opposing a base 57'. The base 57' is secured in the base 21' of the track 20', and the free end 62 extends forwardly from the base 57' such that it is cantilevered over the exit assembly 52'. The cantilever spring 61, being made of spring material, is biased into the raised position shown in FIG. 5A, where the cantilever spring 61 is flush and level with the upper surface 35'. It deflects into a depressed position shown in FIG. 5C, where the cantilever spring 61 recedes into the exit assembly 52'.

The exit assembly 52' is identical to the exit assembly 52 of the cap-lining mechanism 14. It includes a long, slender central ramp 53' flanked on either side by dual-pitch ramps 54'. The central ramp 53' has a width just greater than the width of the cantilever spring 61, so that, when the cantilever spring 61 moves into the depressed position, it recedes below the upper surface 35' of the base 21' into the central ramp 53'.

In operation, the cap-lining mechanism 60 is useful to smoothly and efficiently advance the caps 11 under their own weight or friction into the tamping location D' and then, once tamped, move the lined cap 11 out of the tamping location D'. It does this without automation or monitoring at or around the tamping location D', and without action other than the motion of the tamp 41'. This operation is now described, chiefly with respect to the sequence of steps shown in FIGS. 5A-5G.

FIG. 5A illustrates the cap-lining machine ready to line the first cap 10 with a liner insert. A line of caps 11 moves downstream along a forward path G. The first cap 11 is referred to as the downstream cap 11. It slides and moves smoothly down the track 20' under the force of the weight of the upstream caps 11 or friction. The caps 11 all fit snugly between the sidewalls 22 and 23 of the track 20', and between the lower surface 36' of the cover 34' and the upper surface 35' of the base 21'.

The cantilever spring 61 is in the raised position, projecting forwardly from the upper surface 35' of the base 21' at the exit assembly 52'. As the downstream cap 11 moves forward, it slides over the cantilever spring 61, as shown in FIG. 5B. Because there is no gap between the cap 11 and the lower surface 36' of the cover 34', and because the cantilever spring 61 projects forwardly as a contiguous extension of the upper surface 35', the cap 11 continues to slide directly forward along the forward path G without tilting or pitching, as it would in the cap-lining mechanism 14. The cap 11 thus moves forwardly into confrontation with the stop 43' on the downstream side of the bore 40'.

The downstream edge of the cap 11 contacts the stop 43'. The concave front edge 46' conforms in shape to the radius of the cap 11, and as such, the downstream edge of the cap 11 is flushly received in contact against the concave front edge 46', as shown in FIG. 5B. The stop 43' prevents further downstream movement of the cap 11 along the forward path G. As shown in FIG. 5B, the downstream cap 11 cannot move: the stop 43' prevents downstream movement, the upstream caps 11 prevent upstream movement, and the cantilever spring 61 prevents the cap 11 from slipping under the stop 43'. The sidewalls 22' and 23' prevent lateral movement of the cap 11. The downstream cap 11 is thus prevented from moving along the channel 30' and is held level and parallel by the cantilever spring 61 with respect to the upper surface 35'. While the weight of the cap 11 is not negligible, it is not so great as to overcome the spring force of the cantilever spring 61; as such, the cantilever spring 61 is not deflected, and the downstream cap 11 remains level and parallel to the upper surface 35', level with the upstream caps 11 as well. In this way, the downstream cap 11 is held stationary at the tamping location D', flat, and registered underneath the bore 40' and the tamp 41'.

With the downstream cap 11 so registered, the tamp 41' and punch 42' move downward toward the base 21'. As shown in FIG. 5C, the punch 42' moves downward into the bore 40' and stops before its lower edge exits the bore 40'. The downward movement of the punch 42' cuts the liner insert (not shown) from the web of liner paper (not shown) which is positioned above the cover 34' but below the tamp 41' and punch 42' in their raised positions. After the punch 42' cuts the liner insert, the tamp 41' carries the insert downward as the tamp 41' moves downward into the downstream cap 11. The tamp 41' moves downward into the downstream cap 11, thereby pushing the downstream cap 11 down until the closed top 33 of the cap 11 is received in the seat 57' defined by the upper pitches 55' of the dual-pitch ramp 54'. In moving downward, the force against the cap 11 overcomes the spring force of the cantilever spring 61', and the cantilever spring 61' is pushed downward into the recessed space of the central ramp 53' between the flanking upper pitches 55' of the dual-pitch ramp 54. When the cantilever spring 61 moves into the lowered position, it cooperates with the stop 43' to open the forward path L, as is explained below.

The upper pitches 55' are flat, level, and parallel with respect to the upper surface 35'. As such, the closed top 33 of the downstream cap 11, which is received in flush contact against the upper pitches 55', is parallel with respect to the upper surface 35'. Further, the open bottom 32 of the downstream cap 32 is also parallel to the upper surface 35', and is now just below the stop 43'. As can be seen in FIG. 5C, in this depressed position of the downstream cap 11, the downstream cap 11 is below the stop 43' and a small gap is defined between the open bottom 32 and the stop 43'.

Though the downstream cap 11 is below the stop 43', in FIG. 5C, the downstream edge of the cap 11 is still just behind the front edge 46' of the stop 43'. As shown in FIG. 5D, though, the force of the weight of the upstream caps 11, or friction from a drive belt, immediately pushes the downstream cap 11 downstream and out of the tamping location D'. As soon as the downstream cap 11 moves downstream out of the tamping location D', it slides under the stop 43'; the downstream edge of the downstream cap 11 moves downstream from the front edge 46' of the stop 43'. The tamp 41' has an outer diameter which is less than the inner diameter of the cap 11, and the cap 11 is thus able to slide forward this incremental amount while the tamp 41' is still in the extended position and within the cap 11.

As shown in FIG. 5E, after the tamp 41' has pressed the liner insert into the cap 11, the tamp 41' retracts and moves upward, as does the punch 42'. Once the tamp 41' is above the cap 11, the force of the weight of the upstream caps 11, or friction, pushes the downstream cap 11 further downstream and away from the tamping location D'. Even though the tamp 41' has retracted, the cantilever spring 61 remains depressed in the depressed position in the central ramp 53' because the downstream edge of the cap 11 has slipped under the stop 43' and is thus prevented from moving upward by the stop 43'. Both the back 45' and the wings 46' of the stop 43' are in contact with the cap 11 to prevent it from moving upward.

As the upstream caps 11 move downstream, the downstream cap 11 is pushed out of the exit assembly 52', as shown in FIG. 5F. Once the downstream cap 11 has moved downstream out of the tamping location D' and no longer overlies the cantilever spring 61, the cantilever spring 61 springs back up to its raised position. As it does, the next cap 11 moves forward and slides over the raised cantilever spring 61. The downstream cap 11 exits, and the next cap 11 becomes the next downstream cap 11, moving through the track 20' as described above. This process repeats cyclically over and over, until all caps 11 are processed. Although the above description is provided in the form of a long narrative including a sequence of steps, it should be understood that a single operation cycle of advancing a cap 11 into the tamping location D', tamping a liner insert into the cap 11, and moving the cap 11 out of the tamping location D' is accomplished in smooth, continuous motions taking only a small fraction of a second to perform.

Figure 6:
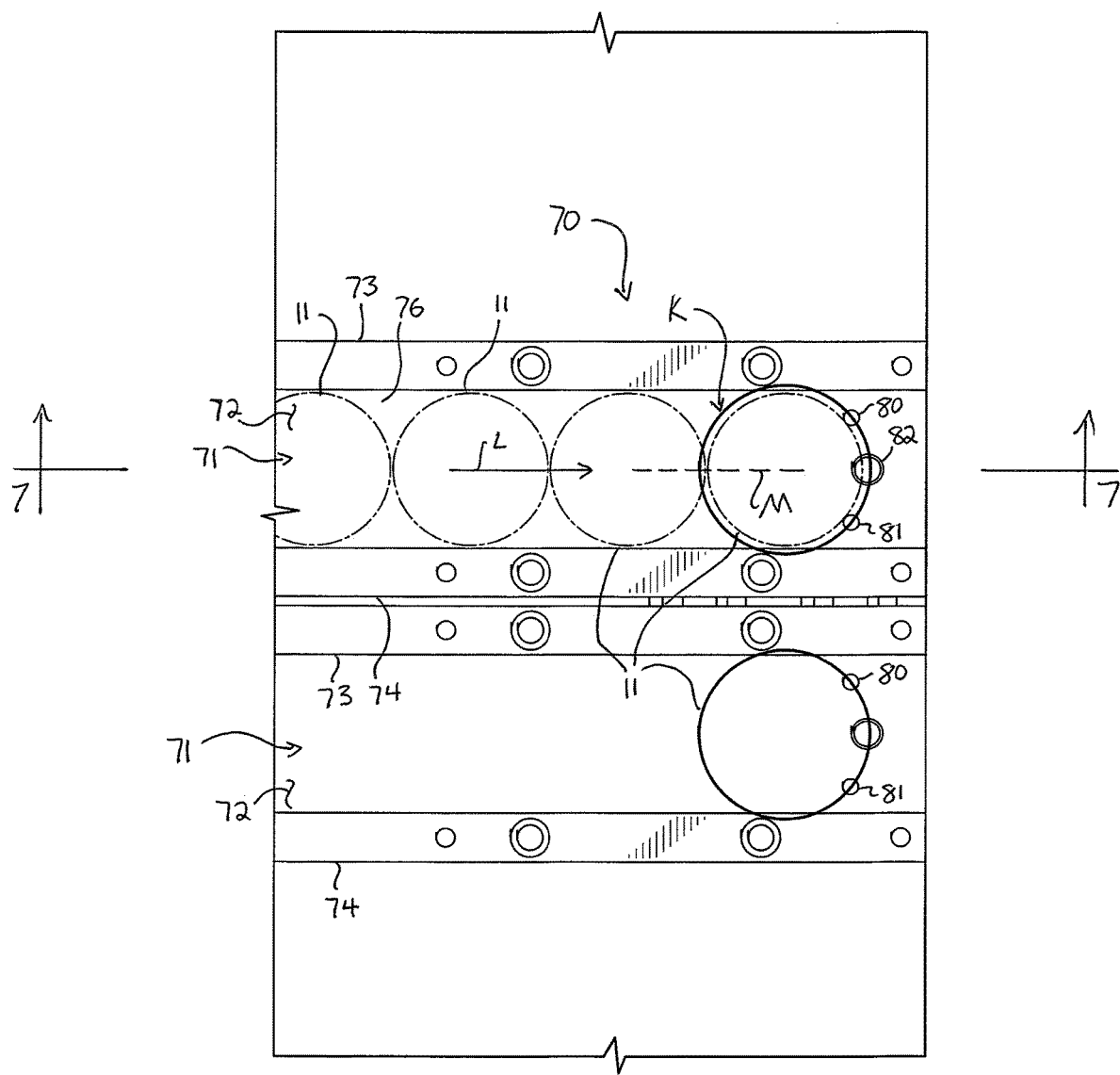
FIG. 6 is a top plan view of a cap-lining mechanism.
Figure 7A:
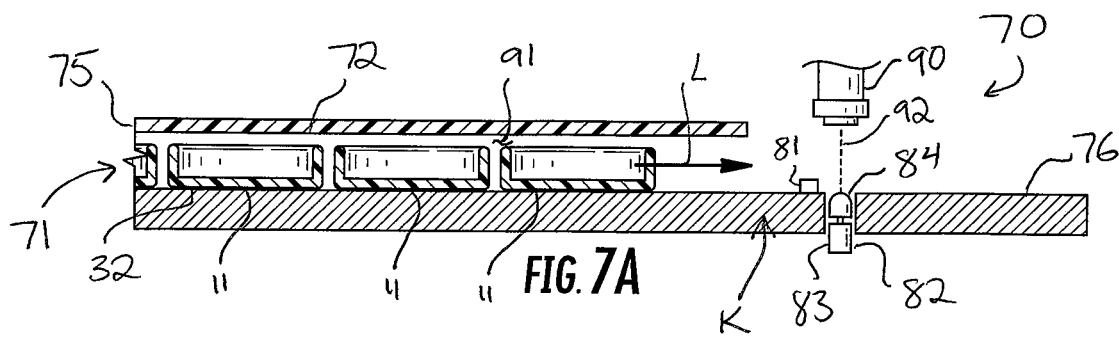
FIGS. 7A-7E are section views of the cap-lining mechanism of FIG. 6 taken along the line 7-7 in FIG. 6, showing a line of caps moving through the cap-lining mechanism.
Figure 7B:
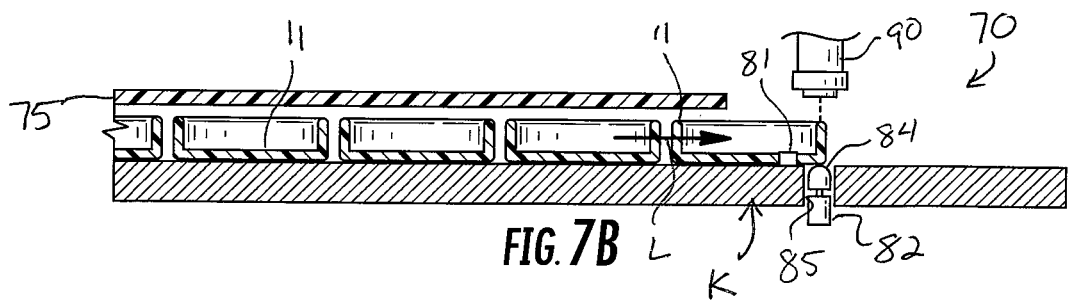
Figure 7C:
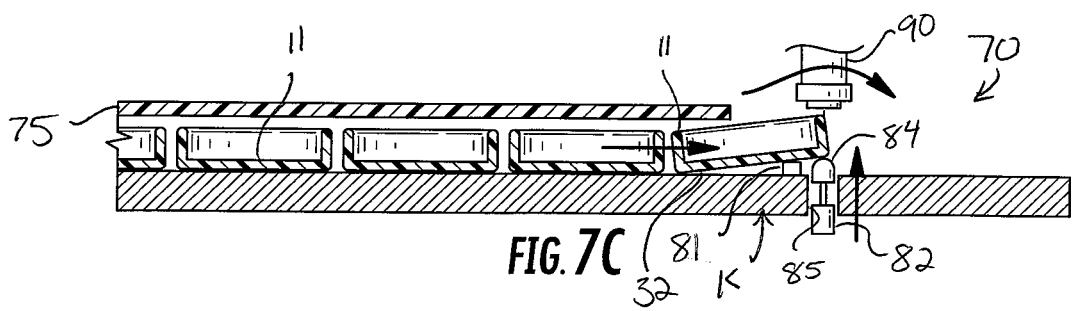
Figure 7D:
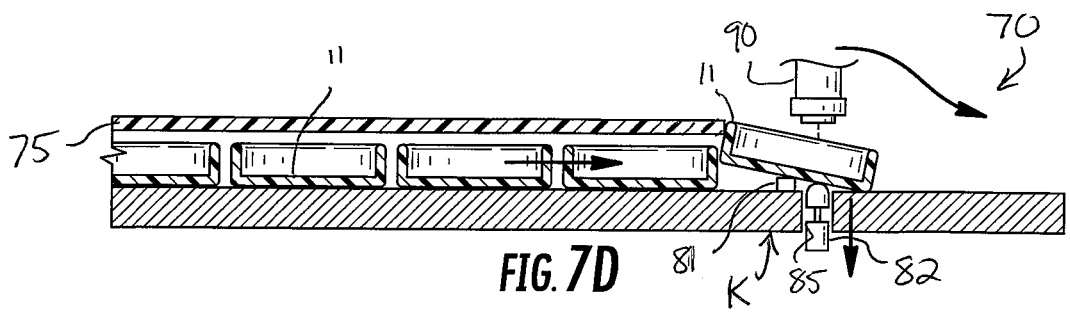
Figure 7E:
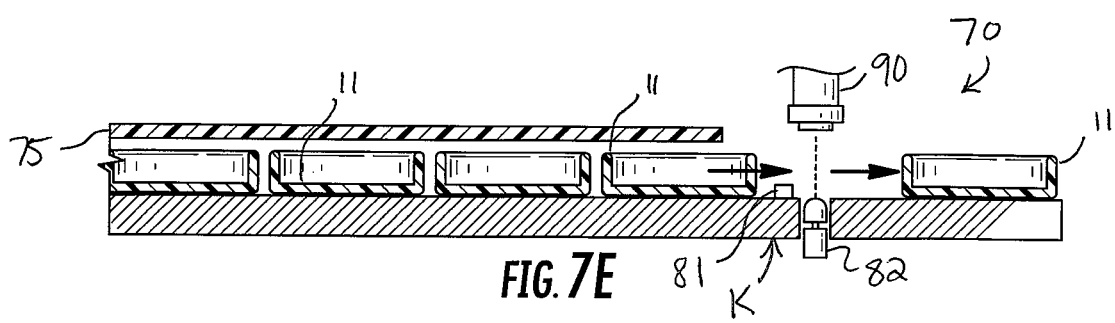

Reference now is made to FIGS. 6-7E, which illustrate an embodiment of a cap-lining mechanism 70 formed in two tracks 71 of a cap-lining machine. The cap-lining mechanism 70 is similar to the cap-lining mechanisms 14 and 60, in that all are capable of feeding, punching, and tamping several caps 11 at once, but the drawings illustrate two tracks 71 for punching and tamping only two caps 11 at a time.

The track 71 includes a channel 72 defined between opposed sidewalls 73 and 74, a cover 75 (illustrated in FIGS. 7A-7E) that extends fully across the track 71 between the sidewalls 73 and 74 along the full length of the track 71, and a base 76 opposite the cover 75. The caps 11 move in the track 71 downstream toward the cap-lining mechanism 70 in preparation for lining. The caps 11 are fed by a gravity feed onto the track 71 from a supply bin or hopper. The base 76 has a low coefficient of friction and allows the caps 11 to slide downstream on their tops 33 with low frictional resistance with respect to the upper surface 35. The base 76 is preferably constructed out of a polished metal, but may be constructed out of another material or combination of materials having low-coefficients of friction, such as plastic. Alternatively, the base 76 may be polished or sprayed with an anti-friction coating, such as polytetrafluoroethylene.

Referring now to FIGS. 6 and 7A, the caps 11 move downstream along a forward path L into a tamping location K. The tamping location K is a circular area on the base 76 having a size corresponding to the caps 11 and which is registered with the tamp of the cap-lining mechanism 70 so that when a cap 11 is disposed in the tamping location K, actuation of the tamp will punch and tamp a liner insert into the cap 11. The cover 75 terminates just short of the tamping location K so that the tamp may reciprocate vertically and unobstructed by the cover 76.

Generally, the caps 11 are advanced under their own weight, or friction, into the tamping location K, as shown in FIG. 6 by the line of upstream caps extending upstream from the tamping location K. The downstream cap 11 is stopped and held at the tamping location K. The downstream cap 11 is held at the tamping location K until the tamp cycles, at which point a kick mechanism moves the downstream cap 11 out of the tamping location K so that it may advance further forward. The structure and function of this operation is now described in detail with reference to FIGS. 7A-7E.

At the downstream end of the track 71, disposed right at the downstream edge of the tamping location K, are two posts 80 and 81. The posts 80 and 81 are short, cylindrical, rigid projections extending upward from the base 76 and are fixed in position. The posts 80 and 81 flank a centerline M of the track 71, and the post 80 is generally intermediately disposed between the sidewall 73 and the centerline M, and the post 81 is generally intermediately disposed between the sidewall 74 and the centerline M. The posts 80 and 81 define the downstream arcuate edge of the tamping location K; when the downstream cap 11 advances into the tamping location K, it is prevented from moving further by interaction with the posts 80 and 81 at the tamping location K. The posts 80 and 81 are identical, and each has a height approximately one-quarter the vertical distance between the cover 75 and the base 76. The posts 80 and 81 are sufficiently high such that the force of the weight of the upstream caps 11 will not force the downstream cap 11 to buckle or pop over the posts 80 and 81. The posts 80 and 81 therefore are stops to prevent further forward movement of the downstream cap 11 out of the tamping location K.

Just slightly downstream from the posts 80 and 81 is a kick mechanism 82. The kick mechanism 82 is disposed in the base 76 and cyclically reciprocates upwardly out of the base 76 and downwardly into the base 76 to "pop" the downstream cap 11 over the posts 80 and 81. The kick mechanism 82 embodied in FIGS. 7A-7E is a piston 83 with a reciprocating head 84. The piston 83 is one of several types: pneumatic, hydraulic, or electric in the form of a solenoid. However, the kick mechanism 82 need not necessarily include a piston. As will be explained, a structural element or feature which pops the downstream cap 11 over the posts 80 and 81 is suitable to act as the kick mechanism. For example, in an embodiment, the head 84 is mounted on a shaft coupled to a rotating eccentric, or is coupled to a cam on a camshaft common to multiple cap-lining mechanisms 70 in a row. As another example, the kick mechanism 82 is an air jet that cyclically emits a puff of air upwardly to push the cap 11 up and over the posts 80 and 81.

The kick mechanism 82 is located at the downstream edge of the tamping location K, at the most-downstream point of the tamping location K, on the centerline M of the track 71. The kick mechanism 82 is thus downstream from the posts 80 and 81; positioning the kick mechanism 82 there ensures that the kick mechanism 82 will lift the downstream edge of the downstream cap 11 sufficiently high so that the cap 11 will can hurdle and clear the posts 80 and 81. The kick mechanism 82 is disposed in a cavity formed through the base 76, and the kick mechanism 82 reciprocates between a lowered position, in which the head 84 is receded within the cavity 85, below the base 76, and below the posts 80 and 81, and a raised position, in which the head 84 extends out of the cavity 85, above the base 76, and above the posts 80 and 81, as shown in FIG. 7C.

An optic 90 is disposed above the tamping location K. The optic 90 is visual sensor capable of detecting the presence or absence of a cap 11 in the tamping location K. The optic 90 is directed just inboard from the downstream edge of the tamping location K, away from the kick mechanism 82, and not on the centerline M. The optic 90 is disposed above the tamping location K and out of the way of the tamp and punch so as to not interfere with their operation. The tamp and punch are not shown in FIGS. 7A-7E for clarity of the illustration, and because their function should be well enough understood by one having ordinary skill in the art from the discussion of the tamp and punch in the earlier embodiments.

In operation, the cap-lining mechanism 70 is useful to smoothly and efficiently advance the caps 11 under their own weight along the forward path L into the tamping location K and then, once tamped, moved the lined cap 11 out of the tamping location K. FIG. 7A illustrates a series of caps 11 moving downstream as indicated by the arrow toward the tamping location K. The downstream cap 11 slides and moves smoothly down the track 71 under the force of the weight of the upstream caps 11, or under the force of friction from a drive belt. The caps 11 all fit snugly between the sidewalls 73 and 74 of the track 71, and are just shorter than the channel 71 with a gap 91 just above the inverted open bottoms 32 of the caps 11. The vertical height of this gap 91, from the cover 75 to the bottoms 32 of the caps 11, is less than the height of the posts 80 and 81, from the base 76 to the tops of the posts 80 and 81.

The optic 90 operates to emit a beam 92 toward the kick mechanism 82. The optic 90 is coupled to a computer, in either wired or wireless communication, which processes the signals from the optic 90. The computer is a microcontroller or other small logic controller. Initially, in FIG. 7A, the optic 90 detects only the base 76, and as such, detects the absence of a cap 11 at the tamping location K. In response to detecting the absence of a cap 11 at the tamping location K, the computer instructs the kick mechanism 82 to move into the lowered position. Because FIG. 7A illustrates an initial state of the machine in which caps 11 are initially being fed, the kick mechanism 82 will initially be in the lowered position. Nonetheless, when the optic 90 detects no cap 11 in the tamping location K, the kick mechanism 82 is instructed to move into the lowered position. As such, the head 84 of the kick mechanism 82 is below the base 76.

The caps 11 continue to advance until the downstream cap 11 is received in the tamping location K, as shown in FIG. 7B. The sidewall of the downstream cap 11 confronts the posts 80 and 81, and the posts 80 and 81 prevent further downstream movement of the downstream cap 11. The posts 80 and 81 are laterally spaced apart, and when the cap 11 rests against them, the cap 11 is registered with the tamping location K, and the downstream-most point of the cap 11 is disposed over the kick mechanism 82 and also under the optic 90. The optic 90 thus detects the presence of the cap 11 at the tamping location K. In response, the computer instructs the kick mechanism 82 to actuate with an impulse. Where the kick mechanism 82 is a piston 83 (whether pneumatic, hydraulic, electric, or otherwise), the rod extending out of the piston 83 rises and the head 82 moves upwardly, as shown in FIG. 7C.

Because the downstream edge of the cap 11 is positioned directly over the kick mechanism 82 and because the head 82 is disposed just below the base 76, actuation of the kick mechanism 82 immediately causes the head 84 to raise the downstream end of the cap 11, thereby kicking the downstream end of the cap 11 up. The kick mechanism 82 immediately retracts into the lowered position after moving to the raised position.

The kick mechanism 82 raises the downstream edge of the cap 11 to a height such that the bottom 32 of the cap 11 is raised above the posts 80 and 81, as seen in FIG. 7C. Once the downstream cap 11 is above the posts 80 and 81, the force of the weight of the upstream caps 11, or friction, acts to move the downstream cap 11 forward. Consequently, the downstream cap 11 immediately hurdles or "pops" over the posts 80 and 81, as shown in FIG. 7D. The downstream edge of the cover 75 does not extend over the tamping location K, so that the tamp may operate through that space. As such, once the downstream edge of the cap 11 has been raised such that the bottom 32 of the cap 11 is moved over the posts 80 and 81, and with the upstream caps 11 pushing the downstream cap 11 forward, the upstream edge of the downstream cap 11 pivots upwardly without interaction with the cover 75. Thus, the downstream cap 11 clears the posts 80 and 81 and moves away from the tamping location K, as shown in FIG. 7E.

The optic 90 continues monitoring the tamping location K during this operation. When the downstream cap 11 first arrives at the tamping location K, the optic 90 detects its presence, and the computer instructs the kick mechanism 82 to actuate with an impulse, as described above. Thus, FIG. 7C shows the head 84 rising, and FIG. 7D shows the head 84 immediately retracting, before the cap has moved fully out of the tamping location K. Therefore, there is a short period of time when the optic 90 detects the presence of the cap 11 at the tamping location K but the computer does not instruct the kick mechanism 82 to actuate: this corresponds to the time subsequent to an impulse actuation of the kick mechanism 82, when the cap 11 is still clearing the tamping location K. The computer will not instruct the kick mechanism 82 to actuate again until the optic 90 first detects the absence of a cap 11 at the tamping location. Because the optic 11 is disposed off the centerline M of the track 71, the optic 90 sees a portion of the caps 11 just off their centerlines as well; this means that as caps 11 pass by, the optic sees a cap 11, then a break between caps 11, then another cap 11, then another break between caps 11, and so on. If the optic 90 continues to detect the presence of cap 11, this indicates that the cap 11 which was kicked is still in the tamping location K. In that situation, the computer would not instruct the kick mechanism 82 to actuate.

However, once the optic 90 again detects only the unobstructed base 76, as it would in FIG. 7E, the computer interprets this to indicate that the cap 11 has left the tamping location K. After FIG. 7E, the process returns to the step of FIG. 7B, in which the next cap 11 is received in the tamping location K. The optic 90 detects this next cap 11, and the computer instructs the kick mechanism 82 to again actuate with an impulse. The steps associated with FIGS. 7B-7E repeat in this manner until all the caps 11 have been tamped or the machine is otherwise shut down. Although the above description is provided in the form of a long narrative including a sequence of steps, it should be understood that a single operation cycle of advancing a cap 11 into the tamping location K, tamping a liner insert into the cap 11, and moving the cap 11 out of the tamping location K is accomplished in smooth, continuous motions taking only a small fraction of a second to perform.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that such modifications do not depart from the spirit of the invention, they are intended to be included within the scope thereof.

The invention claimed is:

1. An assembly for feeding caps to a cap-lining machine, the assembly comprising:
   a track, a tamping location on the track configured to be positioned under a tamp of a cap-lining machine, a stop disposed at the tamping location, and a forward path through the track;
   a spring proximate the tamping location, wherein the spring is spaced apart from the stop and wherein the spring moves between a first position and a second position;
   in the first position of the spring, the spring cooperates with the stop to interrupt the forward path; and
   in the second position of the spring, the spring cooperates with the stop to open the forward path to allow objects to move downstream in the track.

2. The assembly of claim 1, wherein the spring is configured to move from the first position to the second position in response to cycling of the tamp of the cap-lining machine.

3. The assembly of claim 1, wherein the spring is a cantilevered spring extending from an edge of the tamping location into the tamping location.

4. The assembly of claim 1, wherein the spring is opposite the tamping location from the stop.

5. The assembly of claim 1, wherein the spring is upstream from the stop.

6. The assembly of claim 1, wherein the stop is a projection extending downwardly from the track to interrupt the forward path.

7. The assembly of claim 1, wherein:
   the track includes a base with an upper surface;
   the spring is above the upper surface in the first position of the spring; and
   the spring is below the upper surface in the second position of the spring.

8. The assembly of claim 1, wherein:
   the track includes a base with an upper surface;
   the spring is level with the upper surface in the first position of the spring; and
   the spring is below the upper surface in the second position of the spring.

9. The assembly of claim 1, further comprising a ramp formed in the track and which extends downstream away from tamping location.

\* \* \* \* \*